June 12, 1951             J. G. AYERS            2,556,160
METHOD OF UNITING CLAD RODS END-TO-END AND RENDERING
JOINTS UNIFORM WITH THE REMAINDER OF RODS
Filed Feb. 21, 1947

INVENTOR.
JOSEPH G. AYERS
BY
Stebbins, Blenko & Webb
his attorneys

Patented June 12, 1951

2,556,160

UNITED STATES PATENT OFFICE 2,556,160

METHOD OF UNITING CLAD RODS END-TO-END AND RENDERING JOINTS UNIFORM WITH THE REMAINDER OF RODS

Joseph G. Ayers, Mount Lebanon Township, Allegheny County, Pa., assignor to Copperweld Steel Company, Glassport, Pa., a corporation of Pennsylvania Application February 21, 1947, Serial No. 730,170

4 Claims. (Cl. 29—155.42)

This invention relates to the drawing of wire in a continuous length from wire rods of limited length and, in particular, to the welding end-to-end of metal wire rods composed of a core and a layer of cladding metal thereon.

In drawing wire composed of a single metal, it is common to weld successive wire rods together end-to-end, in order to save the loss of time entailed in threading the wire rods through the dies individually, and to produce a continuous wire of greater length than can be drawn from a single rod. Special difficulty is encountered, however, when it is attempted to apply this practice in the drawing of clad wire, e. g., wire composed of a core of steel having a cladding layer of copper welded thereon. The copper of the outer layer melts at a temperature considerably below the welding temperature of the steel core. The loss of copper from the surface exposes the core to atmospheric corrosion at the joint and reduces the electrical conductivity which is a vital factor in many applications of copper-clad wire. The copper melted away can be replaced but the upsetting which occurs at the joint as a result of welding reduces the section of copper which may be restored without exceeding the outside diameter of the composite rod. In addition, copper inclusions in the weld impair the strength thereof so materially that the weld constitutes a perceptibly weak point in the finished wire. The strength of the weld is also reduced by the increase in the grain size of the metal resulting from the heating necessary for welding. All portions of the finished product, of course, must meet certain minimum specifications as to strength and conductivity, in order to be marketable as prime material.

I have invented a novel method for uniting composite wire rods such as copper-clad steel rods, whereby the aforementioned difficulties are overcome. In a preferred practice, I remove the cladding layer from the rods adjacent the ends to be butt welded. Specifically, I machine the rod ends on a taper to a minimum diameter at their extremities less than the original diameter of the core. This leaves each rod entirely free from the cladding metal for a definite distance from the extreme end. I weld the tapered ends of the rods in endwise abutting relation, upsetting the weld sufficiently to make its minimum diameter greater than the original diameter of the core. I then subject the weld to hot working and reduce its diameter substantially to that of the core. I then restore the cladding layer to the core left exposed at the joint, to a thickness equal to that of the layer on the rods intermediate their ends. By uniting successive, composite, wire rods in this manner and drawing them through the usual reducing dies, a continuous wire is produced in which the joints are practically indistinguishable from the remainder of the wire from the standpoint of either physical strength or electrical conductivity and need not, therefore, be cut out, thus making it possible to draw a uniform product of unlimited length.

A complete understanding of the invention may be obtained from the following detailed description and explanation which refer to the accompanying drawings illustrating diagrammatically a conventional wire drawing line and the several steps of my improved method. In the drawings, Figure 1 is a diagrammatic elevation of a wire drawing line including apparatus for welding successive wire rods end-to-end;

Figure 1:
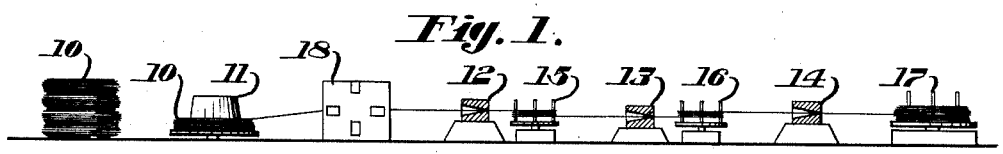

Referring in detail to the drawings, composite wire composed of a core having a layer of cladding metal welded thereon is produced by drawing wire rods through a succession of dies. Figure 1 illustrates the apparatus diagrammatically. Coiled wire rods 10 are placed on an uncoiler 11 and drawn through reducing dies 12, 13 and 14 by drawing blocks 15, 16 and 17. Apparatus for carrying out the method of my invention may conveniently be located between the uncoiler 11 and the first reducing die 12 as indicated diagrammatically at 18. Considering composite wire having a steel core and a copper cladding layer thereon, for the purpose of explanation, it is desirable to produce such wire in unlimited lengths or, at least, to join successive wire rods end-to-end and thus avoid the necessity for threading each individually through the dies Almost any type of weld will suffice for the latter purpose but the welded joint must be cut out of the finished product. This limits the amount of wire that can be drawn in a single length to that which can be produced from a single wire rod. Longer lengths are frequently desirable and avoidance of the necessity for cutting out the welded joints would obviously improve the efficiency of operation. The method of my invention now to be described in detail permits the accomplishment of both these objectives.

Figure 2:
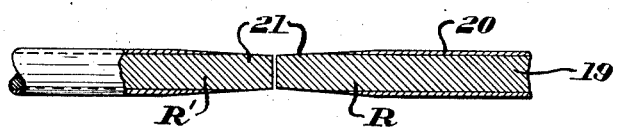
Figure 2 is a partial section showing a pair of rod ends after being machined and abutted preparatory to welding end-to-end.

In a preferred practice, I start a wire rod through the dies and draw it into wire progressively until the trailing end of the coiled wire rod approaches the first die 12. I then stop the drawing blocks, place the next coil of wire rod on the uncoiler 11 and straighten the trailing end of the rod which has already been drawn and the leading end of the succeeding rod. I next remove the cladding layer from the adjacent ends and finish the latter to a square face. Specifically, I finish the ends of the wire rods to be joined on a taper as shown in Figure 2, to a minimum diameter less than that of the core. In Figure 2, R represents the trailing end of the wire rod which has been drawn into wire, for the most part, and R' the leading end of the next succeeding rod. Both the rods comprise a central steel core 19 and a cladding layer 20 welded thereon. The cladding layer may be removed from the rod ends by any convenient machining operation, i. e., turning, cutting or grinding. The important consideration is that the taper on which the ends are machined is such as to leave a portion 21 at the end of each rod which is entirely free from the cladding metal. This result may be attained by machining the extreme ends of the rods to a diameter somewhat less than the original diameter of the core 19. In the case of a ⅜" rod having a core .318" in diameter, for example, it is sufficient to machine the extreme ends of the rod starting at a distance of about 1" from the ends to a diameter of .25" at the extreme ends. The regions 21 adjacent the ends are thus left entirely free of cladding metal for a distance of about ½". These dimensions, however, and those given below are illustrative only since the invention is applicable to rods of different sizes having different thicknesses of cladding thereon. The extremities of the rods are preferably finished to give them a plane face normal to their axis before being machined on a taper as just described. This facing and machining may be effected by any suitable mechanism incorporated in the apparatus indicated diagrammatically at 18.

Figure 3:
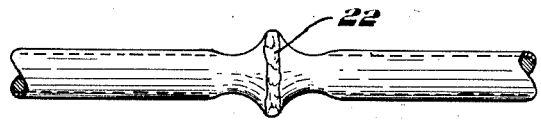
Figure 3 is an elevation showing the completed weld.

When the rod ends R and R' have been preliminarily machined as described above, they are welded together by any suitable type of welder, e. g., a conventional electric butt welder, which may be included in the apparatus 18. Whatever the apparatus employed, the welding is accompanied by a pushup sufficient to upset the weld as indicated at 22 in Figure 3. The upsetting should be continued until the minimum diameter of the core adjacent the weld is somewhat greater than the original diameter of the cores. In the case of cores .318" in diameter, the minimum diameter of the core adjacent the weld after upsetting should be about .33". The maximum diameter may be as great as .70".

Figure 4:
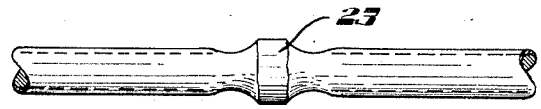
Figure 4 shows a weld after a rough dressing operation.

After completion of the weld, the upset metal or flash 22 is roughly dressed down to about the condition illustrated in Figure 4 at 23. This preliminary dressing of the weld may be effected by any suitable machine tool or by hand. The preliminary dressing of the weld removes from the weld any ruptures, cavities or accumulation of oxide whether on the surface or below it, which might cause defects if not eliminated before drawing down the joint. In other words, the dressing leaves a clean surface at the weld for subsequent forging operation. The amount of reduction effected by the dressing is regulated to leave enough metal to produce a reduction of 40 to 50% in sectional area when the joint is forged to a diameter of about .360".

Figure 5:
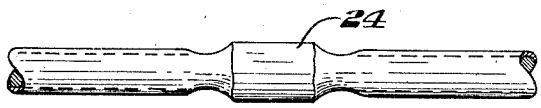
Figure 5 shows a weld after it has been subjected to hot working.

After dressing the weld, I subject it to hot working as by forging with a hammer or squeezing between suitable press jaws, thereby further reducing the weld to a diameter of about .360" and the condition illustrated at 24 in Figure 5. This forging reduces the grain size from the relatively large magnitude resulting from the welding heat to a much smaller size. This improved microstructure of the weld causes the rod to acquire a strength equal to that of the cores themselves, after suitable heat treatment.

Figure 6:
Figure 6 is an elevation showing the forged weld after it has been finished to the desired final diameter.
Figure 7:
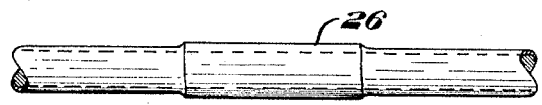
Figure 7 illustrates the restoration of the cladding layer by brazing metal over the portion of the core left exposed at the joint.

After forging, the weld should have a diameter greater than that of the cores, i. e., .360" in the specific example given. After the forging of the weld has been completed, the joint is further dressed down to substantially the diameter of the cores, i. e., .318" as indicated at 25 in Figure 6. The sectional area of the steel at the joint is thus made uniform with the other portions of the rods.

Figure 8:
Figure 8 illustrates the clad welded joint after the layer of cladding metal applied thereto has been trimmed down to the same outside diameter as the layer on the rods at a distance from the joint.

After finally dressing the welded joint, a layer of cladding metal is brazed thereon and united integrally with the layers 20 on the ends of the rods which have been welded together. For this purpose, I employ a split graphite mold provided with an induction heating coil. Small pieces of copper deposited in the mold are melted and fill the cavity in the latter, thereby forming a sheath 26 around the finished weld 25, somewhat thicker than the cladding layer 20. The excess metal is then removed from the sheath 26 surrounding the finished joint 25 after which the finished joint is practically indistinguishable from the remaining portions of the rods, as illustrated at 27 in Figure 8. Since the sectional area of the steel core at the joint is substantially the same as the original section of the cores and the sectional area of the cladding area is restored to its original value and since the grain size of the welded portion has been refined by forging, the physical characteristics of the weld, such as strength, ductility, electrical conductivity, etc. are substantially the same as those of other portions of the rods.

After the rod ends have been united and finished as described above, the drawing blocks are again started and reduction of the wire rod on the uncoiler 11 proceeds until its trailing end approaches the die 12 whereupon the operations described above are repeated.

It will be apparent from the foregoing description and explanation that the invention provides a method of joining composite wire rods having numerous advantages over existing practice. In the first place, inclusion of the cladding metal in the core metal at the weld is prevented by completely removing the cladding layer from the cores adjacent the ends to be welded. By effecting this removal on a taper, I insure that the extreme ends of the rods are entirely free from the cladding layer. At the same time, the welding and upsetting of the bared ends of the cores restores the section of core metal at the weld to the amount needed to give the resulting product as much strength at the weld as in other portions. By forging the core metal upset during the welding, furthermore, I reduce the grain size thereof so that on proper heat treatment, the joint acquires all the original strength and other physical properties of the core. By replacing the cladding layer to precisely the right thickness, the conductivity of the wire at the joints may be made the same as in other portions. Trimming off the excess cladding metal poured around the joint permits the joints to pass through the welding dies without imparting any sudden shock thereto. As a result of the invention, therefore, composite wire may be drawn continuously in as long lengths as may be desirable and it is not necessary to remove the welded joints as they come through the final reducing die.

Although I have illustrated and described a preferred practice of the invention, it will be understood that changes in the procedure disclosed may be made without departing from the spirit of the invention or the scope of the appended claims.

I claim:

1. In a method of uniting, end-to-end, metal rods composed of a core and a layer of cladding metal thereon, the steps including tapering the ends of the rods by the removal of metal therefrom to a minimum diameter at the extreme ends less than that of said cores, butt welding the cores, upsetting the weld to render the minimum diameter thereof greater than the diameter of said cores, reducing the diameter of the upset weld substantially to the diameter of said cores, applying cladding metal over the joint to a thickness greater than that of said layer, and reducing the external diameter of said cladding metal so applied substantially to the normal outside diameter of said layer.

2. In a method of uniting, end-to-end, substantially uniform metal rods composed of a ferrous core and a cladding layer of copper thereon, the steps including tapering the ends of the rods by the removal of metal therefrom to a minimum diameter at the extreme ends less than the diameter of the cores, pressure butt welding the ends of the cores together, upsetting the weld to make the minimum diameter of the weld greater than that of the cores, reducing the weld substantially to the diameter of said cores, and applying molten copper around the welded cores left exposed at the joint to weld the said layers on said rods into a continuous cladding layer of uniform diameter.

3. In a method of uniting, end-to-end, metal rods composed of a core and a layer of cladding metal thereon, the steps including tapering the ends of the rods by the removal of metal therefrom to a minimum diameter at the extreme ends less than that of said cores, pressure welding the cores in abutting relationship, upsetting the weld to render the minimum diameter thereof greater than the diameter of said cores, reducing the diameter of the upset weld by hot working and dressing substantially to the diameter of said cores, and applying cladding metal over the joint to weld the layers of cladding metal on said rods into a continuous cladding layer of uniform diameter.

4. The process of forming a continuous composite metal rod from two or more such metal rods each having a metal core and a covering of cladding metal surrounding said core, comprising, filleting the ends of the rods to be joined by the removal of metal therefrom to a minimum diameter at the extreme ends less than that of said cores, pressure welding the cores at said respective ends in abutting relation to each other, upsetting said weld of said cores by axial pressure to make the minimum diameter thereof at least as great as the normal diameter of said cores, working said upset portion to restore it essentially to the normal diameter and strength of said cores, and covering said joint with molten cladding metal to form a continuous rod with a continuous layer of cladding metal of uniform diameter thereon.

JOSEPH G. AYERS.

REFERENCES CITED

The following references are of record in the file of this patent:

UNITED STATES PATENTS

| Number | Name | Date |
|---|---|---|
| 347,142 | Thomson | Aug. 10, 1886 |
| 396,011 | Thomson | Jan. 8, 1889 |
| 1,607,968 | Spire | Nov. 23, 1926 |
| 1,978,776 | Williams | Oct. 30, 1934 |
| 2,062,886 | Jensen | Dec. 1, 1936 |
| 2,078,546 | Sebell | Apr. 27, 1937 |
| 2,158,799 | Larson | May 16, 1939 |
| 2,177,868 | Chapman | Oct. 31, 1939 |
| 2,209,290 | Watts | July 23, 1940 |
| 2,268,617 | Pierce | Jan. 6, 1942 |
| 2,336,297 | Rooke | Dec. 7, 1943 |
| 2,356,854 | Kirk | Aug. 29, 1944 |